United States Patent
Sutharsan (10) Patent No.: US 8,644,364 B2
(45) Date of Patent: Feb. 4, 2014

(54) METHOD AND SYSTEM FOR COMPUTING A CELL NORMALIZATION FACTOR BY SHARING ARITHMETIC UNITS IN A RAKE RECEIVER TO REDUCE OVERALL IMPLEMENTATION AREA

(75) Inventor: Thirunathan Sutharsan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 448 days.

(21) Appl. No.: 12/616,239

(22) Filed: Nov. 11, 2009

(65) Prior Publication Data

US 2011/0110400 A1    May 12, 2011

(51) Int. Cl.
*H04B 1/69*     (2011.01)
*H04B 1/707*    (2011.01)
*H04B 1/713*    (2011.01)

(52) U.S. Cl.
USPC ........... 375/148; 375/150; 375/144; 375/142; 375/346; 375/343

(58) Field of Classification Search
USPC ......... 375/148, 150, 153, 144, 142, 143, 346, 375/349, 343
See application file for complete search history.

(56) References Cited

U.S. PATENT DOCUMENTS

| | | | |
|---|---|---|---|
| 8,151,158 B2* | 4/2012 | Mudulodu et al. | 714/751 |
| 2007/0098048 A1* | 5/2007 | Cairns et al. | 375/142 |

* cited by examiner

*Primary Examiner* — Phuong Phu
(74) *Attorney, Agent, or Firm* — Sterne, Kessler, Goldstein & Fox P.L.L.C.

(57) ABSTRACT

A mobile device receives downlink transmissions comprising replicas of an original downlink transmitted signal over corresponding fingers of a RAKE receiver comprising arithmetic units. The RAKE receiver computes a cell normalization factor for each of active cells and neighbor cells associated with the RAKE receiver. The RAKE receiver uses the same arithmetic units comprising one adder, one multiplier, one divider and/or one square root unit to compute cell normalization factors. The received downlink transmitted signal is processed using the computed cell normalization factors. The RAKE receiver determines signal power from each of other cells, separately, to compute cell normalization factors to normalize fingers of the RAKE receiver. Interference over the normalized fingers are cancelled and used to process the received downlink transmitted signal, which are combined and Turbo decoded. Phase correction is performed over interference cancelled fingers for active cells, but need not be performed for neighbor cells.

20 Claims, 5 Drawing Sheets

METHOD AND SYSTEM FOR COMPUTING A CELL NORMALIZATION FACTOR BY SHARING ARITHMETIC UNITS IN A RAKE RECEIVER TO REDUCE OVERALL IMPLEMENTATION AREA

CROSS-REFERENCE TO RELATED APPLICATIONS/INCORPORATION BY REFERENCE

Not Applicable.

FIELD OF THE INVENTION

Certain embodiments of the invention relate to signal processing for communication systems. More specifically, certain embodiments of the invention relates to a method and system for computing a cell normalization factor by sharing arithmetic units in a RAKE receiver to reduce overall implementation area.

BACKGROUND OF THE INVENTION

Wideband Code Division Multiple Access (WCDMA) mobile wireless systems have enjoyed widespread uptake of high-quality circuit-switched applications like voice and video telephony. In a WCDMA system, downlink data transmissions are typically designed to be orthogonal at a transmitter. An orthogonal code st is used to combine and separate user data frames. However, the code orthogonality may be destroyed by multiple access interference (MAI) caused by, for example, multipath fading, multiuser interference, and/or interference from other cells, thereby resulting in significant inter-code/inter-path interference at a wireless communications receiver. MAI may result in a downlink data transmission reaching the wireless communications receiver by multipath. More than one replica of an original downlink data transmission may arrive at different time delay at the wireless communications receiver. The effects of multipath may comprise cross-interference of the downlink data transmission and/or phase shifting caused by varying transmission geographic lengths. In digital communications, multipath may also cause inter-symbol interference (ISI) errors and affect the quality of communications. Various sophisticated signal processing techniques such as equalization, orthogonal frequency division modulation, and/or RAKE receivers may be employed at the wireless communications receiver to mitigate or correct ISI for better quality of communications. A RAKE receiver may be used to counteract the effects of multipath using a plurality of correlators, each referred to as a finger. In a RAKE receiver, each finger tunes to a different multipath component of one original data transmission. The plurality of fingers may be combined to generate a single signal, typically having a higher signal-to-noise ratio than the separate signals. The generated single signal from the RAKE receiver may be further processed for channel decoding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for computing a cell normalization factor by sharing arithmetic units in a RAKE receiver to reduce overall implementation area, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for computing a cell normalization factor by sharing arithmetic units in a RAKE receiver to reduce overall implementation area. In various embodiments of the invention, a mobile device is operable to receive downlink transmissions comprising more than one replica of an original downlink transmitted signal from an associated serving base station. The downlink transmitted signal may be received over corresponding fingers of an associated RAKE receiver. The RAKE receiver comprises arithmetic units. The RAKE receiver may be operable to compute a cell normalization factor for each of other cells such as, for example, one or more active cells and one or more neighbor cells associated with the RAKE receiver. To reduce implementation area of the RAKE receiver, the RAKE receiver may be operable to use the same arithmetic units comprising one adder, one multiplier, one divider and/or one square root unit to compute cell normalization factors. The received replicas of the original downlink transmitted signal may be processed according to the computed cell normalization factor for each of the associated active cells and the associated neighbor cells. A cell normalization factor is cell-specific.

The RAKE receiver may be operable to determine power for signals received from each of the active cells and the associated neighbor cells, separately. A cell normalization factor for a specific cell may be computed according to the corresponding signal power determined and/or collected from the specific cell. Each finger of the RAKE receiver may be normalized using the computed cell normalization factor for the specific cell. Interference cancellation may be performed over each normalized finger. The received replicas of the original downlink transmitted signal may be processed using the resulting clean fingers or interference cancelled fingers. The processed replicas of the original downlink transmitted signal may be combined to generate a single signal, which may be further processed for Turbo decoding. For each active cell, the RAKE receiver may be operable to perform phase correction over each of the interference cancelled fingers. No phase correction need be performed over each of the interference cancelled fingers for a neighbor cell.

Figure 1:
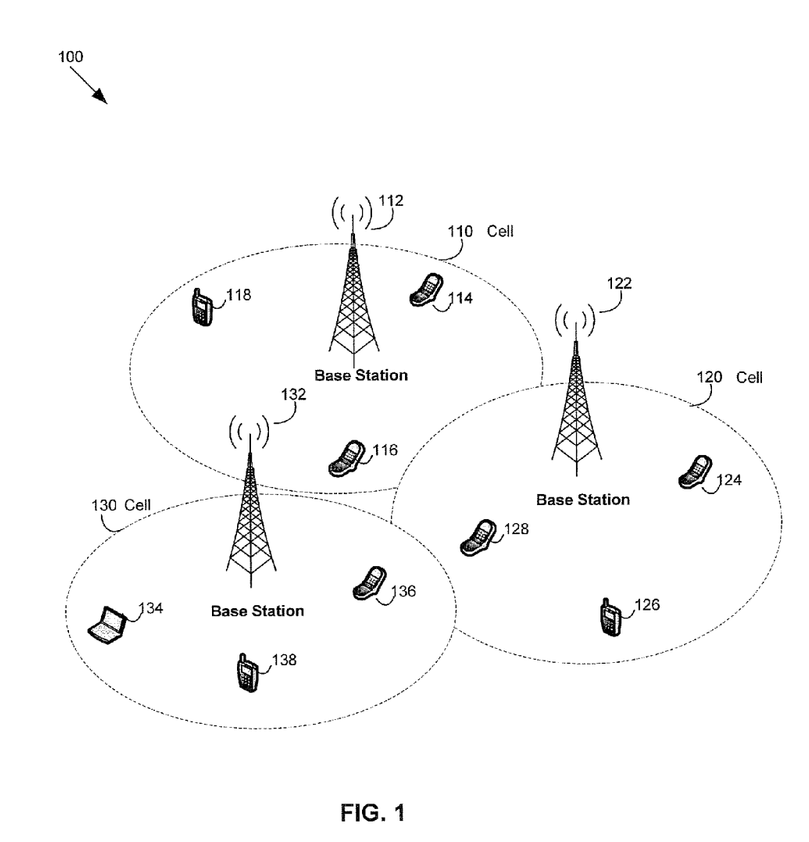
FIG. 1 is a diagram of an exemplary WCDMA communication system that is operable to compute a cell normalization factor by sharing arithmetic units in a RAKE receiver to reduce overall implementation area, in accordance with an embodiment of the invention.

FIG. 1 is a diagram of an exemplary WCDMA communication system that is operable to compute a cell normalization factor by sharing arithmetic units in a RAKE receiver to reduce overall implementation area, in accordance with an embodiment of the invention. Referring to FIG. 1, there is shown a communication system 100 comprising a plurality of cells, of which cells 110-130 are illustrated. The cell 110 comprises a base station (BS) 112 and a plurality of associated mobile devices, of which mobile devices 114-118 are illustrated. The cell 120 comprises a BS 122 and a plurality of associated mobile devices such as, for example, mobile devices 124-128. The cell 130 comprises a BS 132 and a plurality of associated mobile devices, of which mobile devices 134-136 are displayed.

The cells 110-130 comprise geographical areas covered by the BS 112-132, respectively. Each cell may be identified by a unique cell identifier (Cell-ID). For each mobile device such as the mobile device 114 in an associated serving cell such as the cell 110, other cells such as the cell 120 and the cell 130 in the communication system 100 may be associated with an active cell set, a candidate cell set or a neighbor cell set for the mobile device 114. The active cell set comprises a list of cells that are currently connected to the mobile device 114. The candidate cell set comprises a list of cells that are not currently connected to the mobile device 114, but with associated pilot and/or reference signals strong enough to be added to the active cell set. The neighbor cell set comprises a list of cells that are continuously measured by the mobile device 114 and corresponding pilot or reference signals are not strong enough to be added to the active cell set.

A BS such as the BS 112 may comprise suitable logic, circuitry, interfaces and/or code that may be operable to perform air interface processing and schedule communication resources such as spectrum and/or time slots in both uplink communications and downlink communications to various associated mobile devices such as the mobile device 114 in a timely manner. Various algorithms may be used by the BS 112 to determine which associated mobile device may receive a data packet and at what time the receiving should occur. The BS 112 may be operable to support various communication technologies such as, for example, wideband code division multiplex access (WCDMA) and/or high speed packet access (HSPA). For example, in a WCDMA system, the base station 112 may be operable to utilize an orthogonal code set to combine and separate user data frames for downlink data transmissions. Transmission geographic lengths of the downlink data transmissions may vary due to MAI and may cause phase shifting in the downlink data transmissions, which may destroy the orthogonality of the orthogonal code set. An original downlink data transmission from the base station 112 may reach an intended mobile device such as the mobile device 114 over multiple delay paths. More than one replica of the original downlink data transmission from the base station 112 may arrive at the mobile device 114 at different time delay paths.

A mobile device such as the mobile device 114 may comprise suitable logic, circuitry and/or code that may be operable to communicate with a wireless communication network such as a WCDMA network via an associated serving BS such as the BS 112. A signal transmission from the BS 112 may arrive at the mobile device 114 over multiple delay paths (multipath) due to MAI. Multipath may be caused by, for example, path fading, user interference, and/or interference from other cells. More than one replica of the transmitted signal may be received via a different time delayed path by the mobile device 114. The mobile device 114 may be operable to utilize various signal processing techniques such as, for example, equalization and/or RAKE receivers, to counteract interference effects of multipath so as to improve quality of communications. In instances where a RAKE receiver mechanism may be utilized, the mobile device 114 may be operable to allocate a finger to each of the delay paths so as to track signals received over different multipath, respectively. Each allocated finger may be configured to process a received signal over a corresponding path delay. In this regard, each allocated finger may be normalized using a cell normalization factor to balance the interference effects observed from other cells such as, for example, associated active cells and/or neighbor cells. The mobile device 114 may be operable to compute a cell normalization factor for each of the active cells and neighbor cells, respectively. Phase shifting over each allocated finger may be corrected for each of the active cells. The computation for cell normalization factor may be performed by sharing arithmetic units of the mobile device 114 so as to reduce overall implementation area. In this regard, the shared arithmetic units comprise one adder, one multiplier, one divider, and/or one square root unit. The computed cell normalization factor may be used to normalize the allocated fingers at different delay paths. The mobile device 114 may be operable to combine the resulting normalized fingers to generate a single signal, which may be further processed for channel decoding.

In an exemplary operation, a BS, for example, the BS 112 may be operable to communicate a downlink data transmission to an intended mobile device such as the mobile device 114 using, for example, WCDMA technology. The downlink data transmission may reach the mobile device 114 via multipath due to MAI in downlink communication. More than one replica of the downlink data transmission may arrive at the mobile device 114 at different delay paths. The mobile device 114 may be operable to utilize RAKE receiver mechanism to combat interference in the received downlink data transmission. The mobile device 114 may be operable to allocate a finger to each of the delay paths so as to collect and/or track energy of the downlink data transmission arrived. A finger allocated over a particular path delay may be configured to process the downlink data transmission received at the particular path delay. Each allocated finger may be normalized using a cell normalization factor to balance interference effects from each of the active cells and the neighbor cells. Phase shifting may be corrected for the active cells. Arithmetic units of the mobile device 114 may be shared and utilized to compute cell normalization factors so as to reduce overall implementation area of the RAKE receiver circuitry and/or chip. In this regard, one adder, one multiplier, one divider and/or one square root unit may be utilized to compute cell normalization factors. The normalized fingers may be combined to generate a single signal for further processing.

Figure 2:
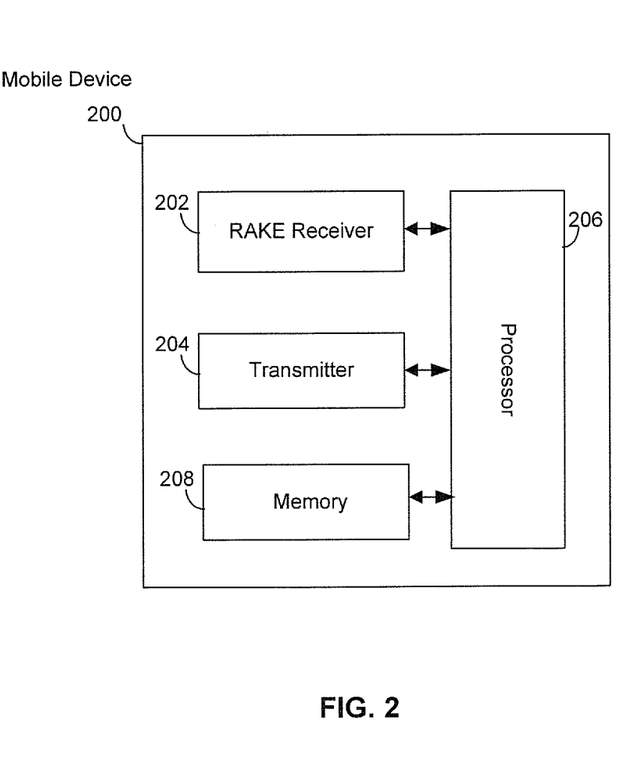
FIG. 2 is a block diagram illustrating an exemplary mobile device that is operable to compute a cell normalization factor by sharing arithmetic units in a RAKE receiver, in accordance with an embodiment of the invention.

FIG. 2 is a block diagram illustrating an exemplary mobile device that is operable to compute a cell normalization factor by sharing arithmetic units in a RAKE receiver, in accordance with an embodiment of the invention. Referring to FIG. 2, there is shown a mobile device 200. The mobile device 200 comprises a RAKE receiver 202, a transmitter 204, a processor 206 and a memory 208.

The RAKE receiver 202 may comprise suitable logic, circuitry, interfaces and/or code that may be operable to process downlink data transmissions received from an associated serving BS such as the BS 112. The received downlink data transmissions may comprise more than one replica of an original downlink data transmission due to the effects of multi-path fading. Each replica of the original downlink data transmission may be received over a specific delay path. In this regard, the RAKE receiver 202 may be operable to assign a finger to each delay path to process a corresponding replica of the original downlink data transmission. The RAKE receiver 202 may be operable to suppress interference levels on the assigned fingers. In this regard, the RAKE receiver 202 may be operable to perform interference suppression on each of the assigned fingers according to changing communication environmental conditions such as, for example, interference from associated active cells and neighbor cells. The RAKE receiver 202 may be operable to process each assigned finger adaptively based on communication environmental conditions, for example, interference caused by the associated active cells and neighbor cells. The RAKE receiver 202 may be operable to normalize each assigned finger using a cell-specific cell normalization factor. The cell-specific cell normalization factor may be computed for each of the associated active cells and neighbor cells. In this regard, arithmetic units in the RAKE receiver 202 may be shared for computing cell normalization factor so as to reduce overall implementation area of the RAKE receiver chip or circuitry. The shared arithmetic units in the RAKE receiver 202 comprise one adder, one multiplier, one divider, and/or one square root unit.

The RAKE receiver 202 may be operable to perform interference suppression or cancellation over each assigned finger to improve quality of downlink communication. In instances where interference caused by a specific cell may be considered, the RAKE receiver 202 may be operable to compute a cell normalization factor using signal power collected from the specific cell. Each assigned finger may be normalized using the computed cell normalization factor for the specific cell. The RAKE receiver 202 may be operable to perform interference suppression or cancellation over each normalized finger. The specific cell may be an associated active cell or an associated neighbor cell. In instances where the specific cell may be an associated active cell, the RAKE receiver 202 may be operable to further process each assigned finger, for example, by performing phase correction. The RAKE receiver 202 may be operable to combine the resulting processed fingers over the different delay paths to generate a single signal, which may be processed for channel decoding.

The transmitter 204 may comprise suitable logic, circuitry, interfaces and/or code that may be operable to process signals to generate uplink data transmissions. The generated uplink data transmissions may be converted to corresponding radio frequency (RF) signals for transmission.

The processor 206 may comprise suitable logic, circuitry, interfaces and/or code that may be operable to process signals communicated via the RAKE receiver 202 and/or the transmitter 206, respectively. The processor 206 may be operable to manage and/or control operations of the RAKE receiver 202 and/or the transmitter 206, respectively. The processor 206 may be operable to handle signals to be transferred to the transmitter 206 for transmission and/or process signals received from the RAKE receiver 202. The processor 206 may be operable to communicate with the RAKE receiver 202 and/or the transmitter 206 to support various applications such as, for example, audio and/or video streaming on the mobile device 200.

The memory 208 may comprise suitable logic, circuitry, interfaces and/or code that may be operable to store information such as executable instructions and data that may be utilized by the processor 206. The executable instructions may comprise functions or operations that may be applied to various signal processes such as cell normalization factor computation and/or interference cancellation. The memory 208 may comprise RAM, ROM, low latency nonvolatile memory such as flash memory and/or other suitable electronic data storage.

In an exemplary operation, the RAKE receiver 202 may be operable to process downlink data transmissions received from an associated serving BS such as, for example, the BS 112 in the cell 110. The received downlink data transmissions may comprise more than one replica of an original downlink data transmission received at different delay paths due to MAI caused by, for example, multipath fading, and/or interference from other cells such as the cell 120 and/or the cell 130. The RAKE receiver 202 may be operable to assign a finger to each delay path to process a corresponding replica of the original downlink data transmission received. Interference effects on each assigned finger may be suppressed or cancelled according to changing communication environmental conditions, for example, interference from other cells such as the cell 120 and the cell 130. The assigned fingers may be normalized using a cell normalization factor. The cell normalization factor is cell-specific and may be calculated using signal energy collected from a specific cell. For example, to cancel or suppress interference caused by the cell 120, a cell normalization factor for the cell 120 may be computed using signal energy collected from the cell 120 by the RAKE receiver 202.

The RAKE receiver 202 may be operable to normalize each assigned finger using the computed cell normalization factor. Interference cancellation may be performed on each normalized finger to combat interference from the cell 120. A cell normalization factor is computed for each of the associated active cells and neighbor cells of the mobile device 200. In this regard, the RAKE receiver 202 may be operable to share arithmetic units to compute cell normalization factors so as to reduce overall implementation area. The RAKE receiver 202 may be operable to share one adder, one multiplier, one divider and/or one square root unit to perform required computes for cell normalization factors. In instances where interference caused by an active cell such as the cell 120 may be considered, the RAKE receiver 202 may be operable to continuously process each normalized finger by performing phase correction. The resulting processed fingers may be combined to generate a single signal, which may be further processed for channel decoding. The resulting Turbo decoded signal may be communicated with the processor 206 to support applications associated with the received downlink data transmission, for example, audio and/or video streaming on the mobile device 200.

Figure 3:
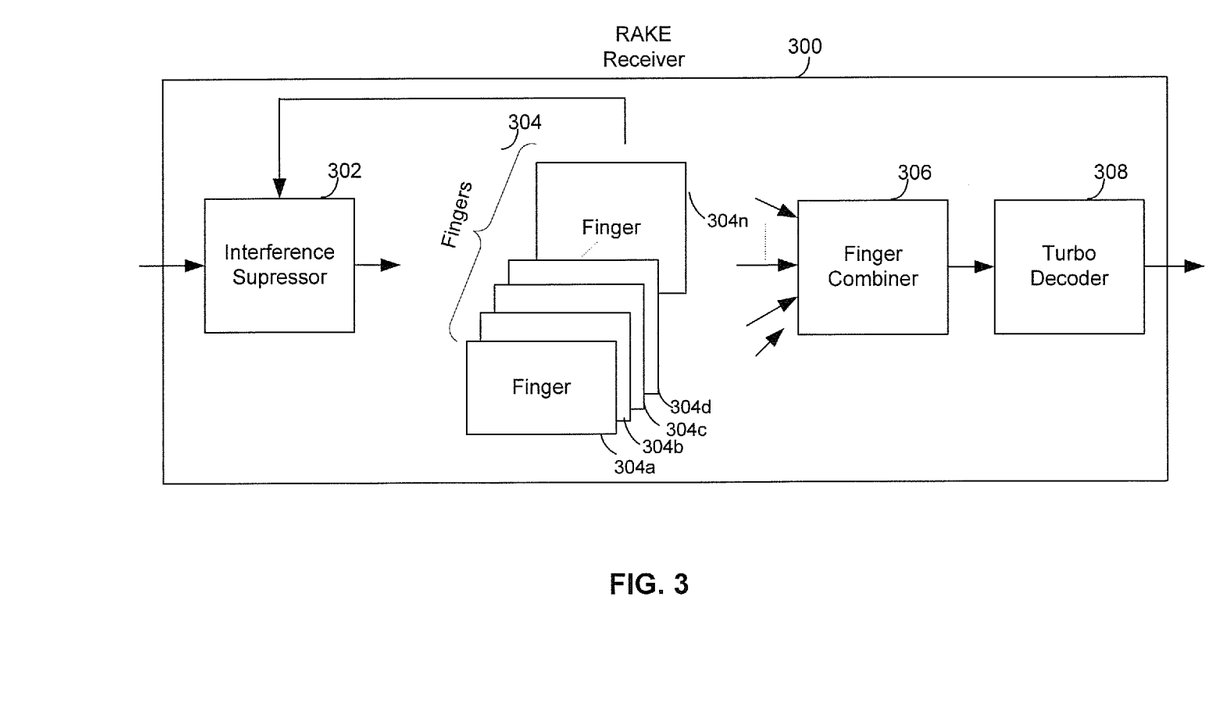
FIG. 3 is a block diagram illustrating an exemplary RAKE receiver that is operable to compute a cell normalization factor by sharing arithmetic units to reduce overall implementation area, in accordance with an embodiment of the invention.

FIG. 3 is a block diagram illustrating an exemplary RAKE receiver that is operable to compute a cell normalization factor by sharing arithmetic units to reduce overall implementation area, in accordance with an embodiment of the invention. Referring to FIG. 3, there is shown a RAKE receiver 300. The RAKE receiver 300 comprises an interference suppressor 302, a plurality of fingers 304, of which fingers 304*a*-304*n* are illustrated, a finger combiner 306 and a Turbo decoder 308.

The interference suppressor 302 may comprise suitable logic, circuitry, interfaces and/or code that may be operable to perform interference suppression on downlink data transmissions received from a serving base station such as the base station 112 of the cell 110. More than one replica of an original downlink data transmission may be received from the base station 112 due to MAI caused by, for example, interference from other cells such as the cells 120-130. The interference suppressor 302 may be operable to capture both finger gain and finger position information from each of the fingers 304a through 304n. The interference suppressor 302 may be operable to perform interference suppression over each of the fingers 304a through 304n according to corresponding captured finger gain and finger position. The fingers 304a through 304n may be normalized using cell normalization factors.

The cell normalization factors are cell-specific and may be used to combat or balance interference effects from other cells. The cell normalization factors may be calculated using signal energy collected from corresponding cells. For example, an associated RAKE receiver such as the RAKE receiver 300 may be operable to determine the energy of signals for the cell 120. The interference suppressor 302 may be operable to utilize the signal energy from the cell 120 to compute a cell normalization factor for the cell 120. To suppress interference caused by the cell 120, each of the fingers 304a through 304n that are associated with cell 120 may be normalized using the computed cell normalization factor for the cell 120. The interference suppressor 302 may be operable to perform interference cancellation or suppression on each resulting normalized finger to combat interference from the cell 120. The interference suppressor 302 may be operable to compute a cell normalization factor for each of the associated active cells and neighbor cells of the RAKE receiver 300. The interference suppressor 302 may be operable to share arithmetic units required for cell normalization factor computation so as to reduce overall implementation area. In this regard, the interference suppressor 302 may be operable to utilize one adder, one multiplier, one divider and/or one square root unit to perform cell normalization factor computation for each of the associated active or neighbor cells, for example, the cell 120.

A finger such as the finger 304a may comprise suitable logic, circuitry, interfaces and/or code that may be operable to process downlink data transmission received at a specific time delay. The finger 304a may be characterized by finger gain and finger position, which corresponds to the specific time delay. The finger gain may be related to a channel gain at the finger position. The finger 304 may be operable to constantly track the multipath at the specific time delay. A signal corresponding to a strong multipath at the specific time delay may be demodulated and communicated to the finger combiner 306.

The finger combiner 306 may comprise suitable logic, circuitry, interfaces and/or code that may be operable to combine signals from each of the fingers 304a through 304n to generate a single signal. Various techniques may be used by the finger combiner 306 for signal combining. For example, the finger combiner 306 may be operable to coherently combine the signals from the fingers 304a through 304n. The finger combiner 306 may also be operable to perform a weighted signal combining on signals contributed by the fingers 304a through 304n. The resulting combined signal may be communicated with the Turbo decoder 308 for Turbo decoding.

The Turbo decoder 308 may comprise suitable logic, circuitry, interfaces and/or code that may be operable to perform Turbo decoding on the signal received from the finger combiner 306.

In an exemplary operation, the RAKE receiver 300 may be operable to receive downlink data transmissions from an associated serving base station such as, for example, the BS 112 in the cell 110. The received downlink data transmissions may comprise more than one replica of an original downlink data transmission received at different delay paths due to MAI caused by, for example, interference from other cells such as the cell 120 and/or the cell 130. The RAKE receiver 300 may be operable to perform interference suppression on the received downlink data transmissions via the interference suppressor 302. The interference suppressor 302 may be operable to process the fingers 304a through 304n so as to combat interference effects from other cells such as, for example, the cell 120 and/or the cell 130. A cell-specific cell normalization factor may be computed for the cell 120 and the cell 130, respectively. Each of the fingers 304a through 304n may be normalized using the computed corresponding cell normalization factors. To reduce overall implementation area, one adder, one multiplier, one divider and/or one square root unit within the interference suppressor 302 may be shared for computing cell normalization factors. Interference suppression may be performed on each normalized finger. The resulting clean (interference-free) fingers may be used to process the received downlink data transmission at corresponding time delays. The processed downlink data transmission over different time delays may be combined via the finger combiner 306 for Turbo decoding via the Turbo decoder 308.

Figure 4:
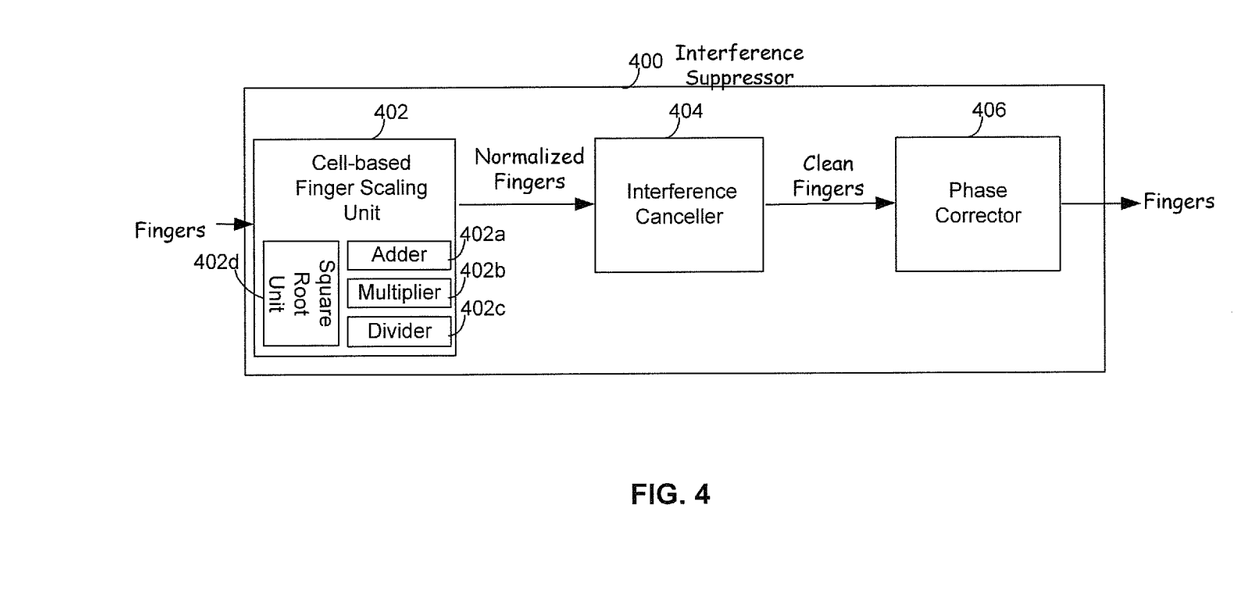
FIG. 4 is a block diagram illustrating an exemplary interference suppressor that is operable to compute a cell normalization factor by sharing arithmetic units to reduce overall implementation area, in accordance with an embodiment of the invention.

FIG. 4 is a block diagram illustrating an exemplary interference suppressor that is operable to compute a cell normalization factor by sharing arithmetic units to reduce overall implementation area, in accordance with an embodiment of the invention. Referring to FIG. 4, there is shown an interference suppressor 400. The interference suppressor 400 comprises a cell-based finger scaling unit 402, an interference canceller 404 and a phase corrector 406. The cell-based finger scaling unit 402 comprises an adder 402a, a multiplier 402b, a divider 402c and a square root unit 402d.

The cell-based finger scaling unit 402 may comprise suitable logic, circuitry, interfaces and/or code that may be operable to scale fingers, for example, the fingers 304a through 304n, using a cell-specific cell normalization factor. The cell-based finger scaling unit 402 may be operable to compute a cell normalization factor for each of active cells and neighbor cells of an associated wireless receiver such as the RAKE receiver 300. The cell-based finger scaling unit 402 may be operable to share arithmetic units comprising the adder 402a, the multiplier 402b, the divider 402c and the square root unit 402d for computing cell normalization factors.

The adder 402a may comprise suitable logic, circuitry, interfaces and/or code that may be operable to perform an addition operation. The multiplier 402b may comprise suitable logic, circuitry, interfaces and/or code that may be operable to perform a multiplication operation.

The divider 402c may comprise suitable logic, circuitry, interfaces and/or code that may be operable to perform a division operation. The multiplier 402b may comprise suitable logic, circuitry, interfaces and/or code that may be operable to perform a squared root operation.

A cell normalization factor is cell-specific and may be calculated using signal energy collected from corresponding cells. For example, a cell normalization factor for the cell 120 may be computed using signal energy collected from the cell 120. In instances where suppression of interference from cell 120 may be considered to improve reception of downlink data transmissions from the base station 112, each of the fingers 304a through 304n which are assigned to cell 120 may be normalized using a cell normalization factor calculated for the cell 120. The cell-based finger scaling unit 402 may be operable to communicate the normalized fingers to the interference canceller 404 to perform interference cancellation on the downlink data transmissions received over each normalized finger.

The interference canceller 404 may comprise suitable logic, circuitry, interfaces and/or code that may be operable to perform interference cancellation over each normalized finger and provide clean (interference-free) fingers to the phase corrector 406.

The phase corrector 406 may comprise suitable logic, circuitry, interfaces and/or code that may be operable to perform phase correction on each clean finger for active cells. No phase correction may be required and/or performed for neighbor cells.

In an exemplary operation, the cell-based finger scaling unit 402 may be operable to compute a cell normalization factor for each of the associated active cells and neighbor cells. The adder 402a, the multiplier 402b, the divider 402c and the square root unit 402d may be shared for computing cell normalization factors. For example, in instances where a cell normalization factor is computed for each of different cells such as associated active cells and/or neighbor cells, the rake receiver 300 may be operable to repeatedly activate and use the same arithmetic components such as, for example, the adder 402a, the multiplier 402b, the divider 402c and the square root unit 402d, to perform addition operation, multiplication operation, division operation and/or squared root operation, respectively, so as to reduce overall implementation area of the RAKE receiver circuitry and/or chip. To remove interference effects from a specific cell, namely, an associated active cell or an associated neighbor cell, the fingers 304a through 304n which are assigned to that cell may be normalized using a cell normalization factor computed for the specific cell. The interference canceller 404 may be operable to perform interference cancellation on normalized fingers. Phase shifting may be corrected on each clean finger for each of associated active cell.

Figure 5:
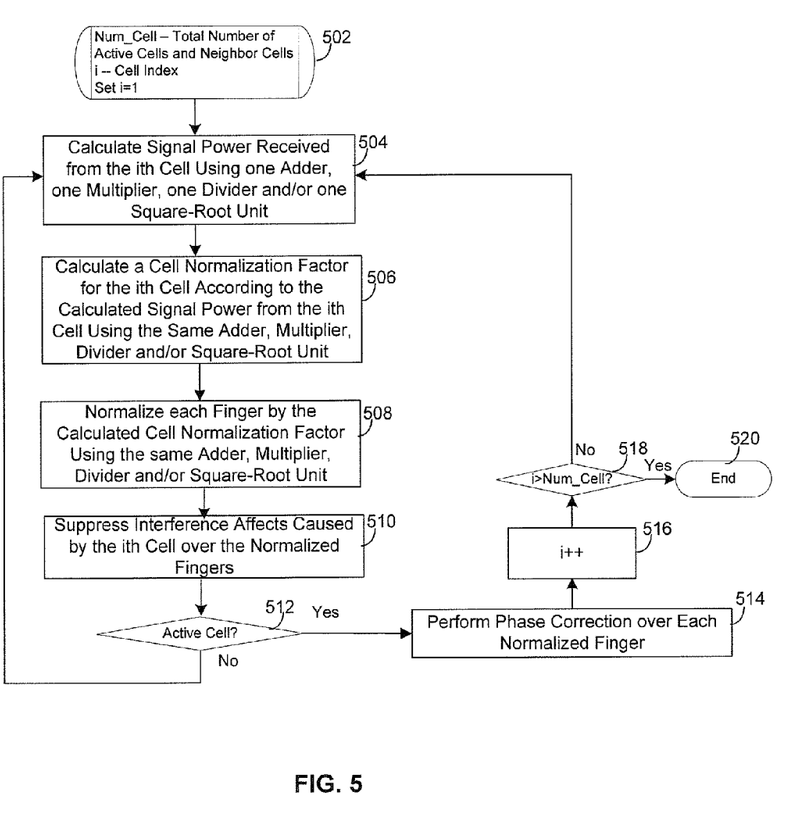
FIG. 5 is a flow chart illustrating exemplary steps that are used to combat interference from associated active cells and neighbor cells over normalized fingers, in accordance with an embodiment of the invention.

FIG. 5 is a flow chart illustrating exemplary steps that are used to combat interference from associated active cells and neighbor cells over normalized fingers, in accordance with an embodiment of the invention. The exemplary steps start with step 502. A parameter Num_cell is the number of active cells and neighbor cells associated with the RAKE receiver 300. A parameter i is a cell index. In step 502, the cell index i may be set equal to 1. In step 504, the cell-based finger scaling unit 402 may be operable to compute signal power collected from the $i^{th}$ cell using the adder 402a, the multiplier 402b, the divider 402c and/or the square-root unit 402d. In step 506, the cell-based finger scaling unit 402 may be operable to calculate a cell normalization factor for the $i^{th}$ cell according to the calculated signal power from the $i^{th}$ cell using the adder 402a, the multiplier 402b, the divider 402c and/or the square-root unit 402d. In step 508, the cell-based finger scaling unit 402 may be operable to normalize each finger using the calculated cell normalization factor using the adder 402a, the multiplier 402b, the divider 402c and/or the square-root unit 402d. In step 510, the interference canceller 404 may be operable to suppress interference effects caused by the $i^{th}$ cell over the normalized fingers. In step 512, it may be determined whether the $i^{th}$ cell is an active cell. In instances where the $i^{th}$ cell is an active cell, then in step 514, the phase corrector 406 may be operable to perform phase correction over each clean (interference-free) fingers. In step 516, the cell index i is incremented by one. In step 518, it may be determined whether the cell index i is greater than Num_cell. In instances where the cell index i is not greater than Num_cell, then exemplary steps return to step 504.

In step 512, in instances where the $i^{th}$ cell is not an active cell, then the exemplary steps return to step 504.

In step 518, in instances where the cell index i is greater than Num_cell, then exemplary steps end in step 520.

Aspects of a method and system for computing a cell normalization factor by sharing arithmetic units in a RAKE receiver to reduce overall implementation area are provided. In accordance with various embodiments of the invention, a mobile device such as the mobile device 114 may be operable to receive downlink transmissions from, for example, the BS 110. The received downlink data transmission may comprise replicas of an original downlink transmitted signal, which may be received over corresponding fingers of an associated RAKE receiver such as the RAKE receiver 300. The RAKE receiver 300 comprises arithmetic units such as the adder 402a, the multiplier 402b, the divider 402c, and the square root unit 403d. The cell-based finger scaling unit 402 in the RAKE receiver 300 may be operable to compute a cell normalization factor for each of one or more active cells and one or more neighbor cells associated with the RAKE receiver 300. To reduce implementation area, the cell-based finger scaling unit 402 may be operable to use the same arithmetic units such as the adder 402a, the multiplier 402b, the divider 402c and/or the square root unit 402d to compute cell normalization factors. The received replicas of the original downlink transmitted signal may be processed according to the computed cell normalization factor for each of the associated one or more active cells and the associated one or more neighbor cells.

A cell normalization factor is cell-specific. The RAKE receiver 300 may be operable to collect signal power received from each of the active cells and the associated neighbor cells, separately. A cell normalization factor for a specific cell such as the cell 120 may be computed according to corresponding signal power collected from the cell 120. Each of the fingers of the RAKE receiver 300 assigned to cell 120 may be normalized using the computed cell normalization factor for the cell 120. The interference canceller 404 may be operable to perform interference cancellation over each normalized finger from the cell-based finger scaling unit 402. The received more than one replica of the downlink transmitted signal may be processed using resulting clean fingers (interference cancelled fingers). The finger combiner 306 of the RAKE receiver 300 may be operable to combine the processed more than one replica of the downlink data transmission to generate a single signal. The generated single signal may be further processed for Turbo decoding. Depending on cell type, phase correction may be optionally performed. For example, in instances where interference effect from an active cell may be evaluated during the interference cancellation, the phase corrector 406 may be operable to subsequently perform phase correction over each of the interference cancelled fingers from the interference canceller 404. In instances where interference effect from a neighbor cell may be evaluated during the interference cancellation, the phase corrector 406 may not perform phase correction over each of the interference cancelled fingers from the interference canceller 404.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for computing a cell normalization factor by sharing arithmetic units in a RAKE receiver to reduce overall implementation area.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
    performing by one or more processors and/or circuits in a communication device, wherein said one or more processors and/or circuits comprises a RAKE receiver including a shared arithmetic unit:
        receiving replicas of an original downlink transmitted signal via corresponding fingers of said RAKE receiver;
        computing a cell normalization factor for a cell associated with said received replicas; and
        processing each of said received replicas of said original downlink transmitted signal with said computed cell normalization factor using said shared arithmetic unit to thereby reduce implementation area.

2. The method according to claim 1, wherein said shared arithmetic unit comprises an adder, a multiplier, a divider and/or a square root unit.

3. The method according to claim 1, further comprising:
    determining signal power received from the cell using the shared arithmetic unit.

4. The method according to claim 3, wherein the computing includes computing said cell normalization factor for the cell using the shared arithmetic unit according to said determined signal power.

5. The method according to claim 4, wherein the processing includes normalizing each of said fingers of said RAKE receiver using said computed cell normalization factor.

6. The method according to claim 5, further comprising:
    cancelling interference from each of said corresponding normalized fingers.

7. The method according to claim 6, wherein the processing includes processing said received replicas of said original downlink transmitted signal using resulting interference cancelled fingers.

8. The method according to claim 7, further comprising:
    combining said processed replicas of said original downlink transmitted signal to generate a single signal; and
    Turbo decoding said generated single signal.

9. The method according to claim 6, further comprising:
    performing phase correction, subsequently to said interference cancellation, over each of resulting interference cancelled fingers, if the cell is an active cell.

10. The method according to claim 6, further comprising:
    declining to perform phase correction subsequently to said interference cancellation, over each of resulting interference cancelled fingers, if the cell is a neighbor cell.

11. A system for signal processing, the system comprising:
    one or more processors and/or circuits for use within a communication device, wherein said one or more processors and/or circuits comprises a RAKE receiver including a shared arithmetic unit, wherein:
    said one or more processors and/or circuits are configured to receive replicas of an original downlink transmitted signal via corresponding fingers of said RAKE receiver;
    said one or more processors and/or circuits are configured to compute a cell normalization factor for a cell associated with said received replicas; and
    said one or more processors and/or circuits are configured to process each of said received replicas of said original downlink transmitted signal with said computed cell normalization factor using said shared arithmetic unit to thereby reduce implementation area.

12. The system according to claim 11, wherein said shared arithmetic unit comprises an adder, a multiplier, a divider and/or a square root unit.

13. The system according to claim 11, wherein said one or more processors and/or circuits are further configured to determine signal power received from the cell using the shared arithmetic unit.

14. The system according to claim 13, wherein said one or more processors and/or circuits are further configured to compute said cell normalization factor for the cell using the shared arithmetic unit according to said determined signal power.

15. The system according to claim 14, wherein said one or more processors and/or circuits are further configured to normalize each of said fingers of said RAKE receiver using said computed cell normalization factor.

16. The system according to claim 15, wherein said one or more processors and/or circuits are further configured to cancel interference from each of said corresponding normalized fingers.

17. The system according to claim 16, wherein said one or more processors and/or circuits are further configured to process said received replicas of said original downlink transmitted signal using resulting interference cancelled fingers.

18. The system according to claim 17, wherein said one or more processors and/or circuits are further configured to combine said processed replicas of said original downlink transmitted signal to generate a single signal; and said one or more processors and/or circuits are further configured to Turbo decode said generated single signal.

19. The system according to claim 16, wherein one or more processors and/or circuits are further configured to perform phase correction, subsequently to said interference cancellation, over each of resulting interference cancelled fingers, if the cell is an active cell.

20. The system according to claim 16, wherein no phase correction is performed subsequently to said interference cancellation, over each of resulting interference cancelled fingers, if the cell is a neighbor cell.

* * * * *